United States Patent [19]

Nagano et al.

[11] Patent Number: 5,756,189
[45] Date of Patent: May 26, 1998

[54] RESIN PRODUCT HAVING A SKIN LAYER AND METHOD FOR MANUFACTURING THE SAME

[75] Inventors: Akiyoshi Nagano, Aichi-ken; Kenichi Furuta; Katsuhiro Katagiri, both of Gifu-ken; Tetsuya Fujii, Aich-ken; Hiroshi Suyama, Gifu-ken, all of Japan

[73] Assignee: Toyoda Gosei Co., Ltd., Aichi, Japan

[21] Appl. No.: 557,325

[22] Filed: Nov. 14, 1995

[30] Foreign Application Priority Data

Nov. 14, 1994 [JP] Japan ................ 6-279233

[51] Int. Cl.⁶ .................................................. B32B 9/00
[52] U.S. Cl. .................. 428/198; 428/71; 428/318.6; 428/318.8; 428/319.3; 428/319.7; 428/420; 428/424.8; 264/45.5; 264/46.8; 264/266; 264/328.1; 156/242; 156/245
[58] Field of Search ................. 428/318.6, 318.8, 428/420, 71, 319.3, 319.7, 424.8, 198; 264/45.5, 266, 46.8, 328.1; 156/242, 245

[56] References Cited

U.S. PATENT DOCUMENTS

| | | | |
|---|---|---|---|
| 5,354,397 | 10/1994 | Miyake et al. | 156/77 |
| 5,429,786 | 7/1995 | Jogan et al. | 264/255 |
| 5,474,841 | 12/1995 | Matsuki et al. | 428/304.4 |
| 5,564,249 | 10/1996 | Borys et al. | 428/122 |

FOREIGN PATENT DOCUMENTS

| | | |
|---|---|---|
| 2-223415 | 9/1990 | Japan . |
| 4-255312 | 9/1992 | Japan . |

*Primary Examiner*—Patrick Ryan
*Assistant Examiner*—Abraham Bahta
*Attorney, Agent, or Firm*—Cushman Darby & Cushman IP Group of Pillsbury Madison & Sutro LLP

[57] ABSTRACT

A console lid comprises a base having a predetermined rigidity and a skin layer member having an inner layer and an outer layer, which covers the base. A cushioning layer made of foamed polyurethane having a thickness that decreases toward the ends thereof is provided between the top of the base and the skin layer member. The skin layer member which has been trimmed is positioned in a mold and the cushioning layer is positioned so that it is in contact with the skin layer member. A plasticized resin is charged into a mold cavity from a gate to form a base. Excellent soft touch and feel is provided by the resulting composite structure since the cushioning layer, made of a soft material, is provided between the base and the skin layer member in a position where such a soft touch or cushioning is most desirable.

8 Claims, 4 Drawing Sheets

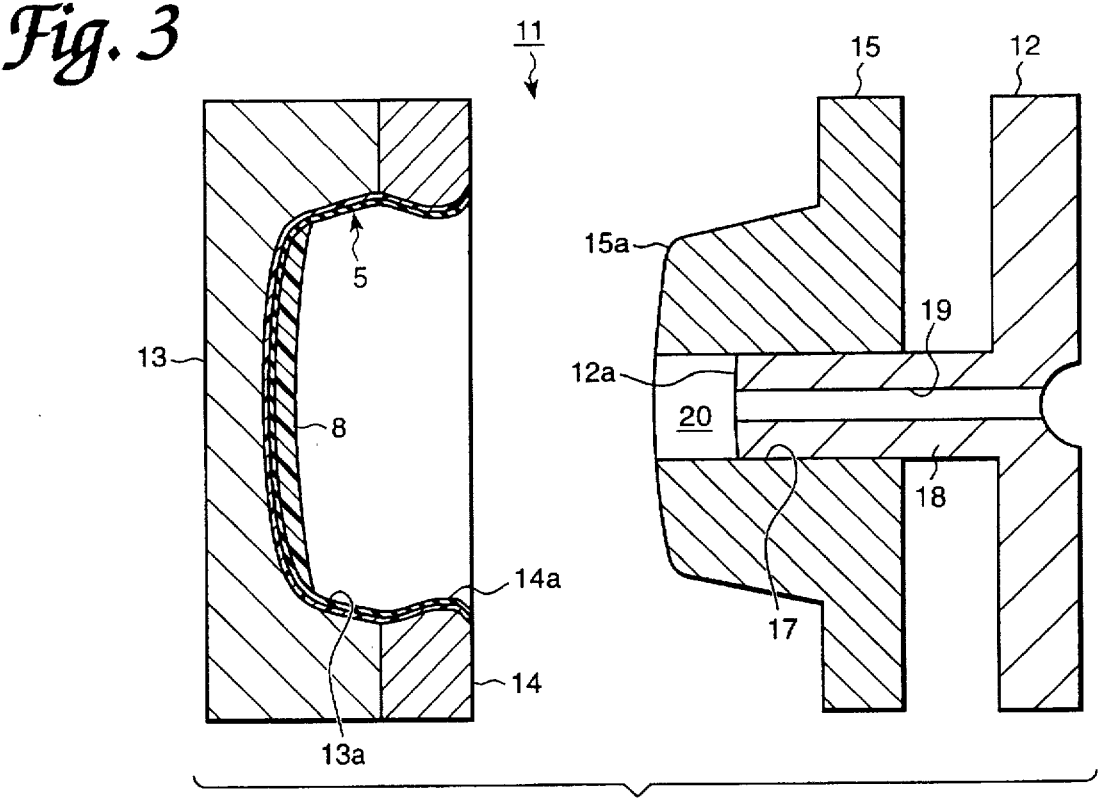
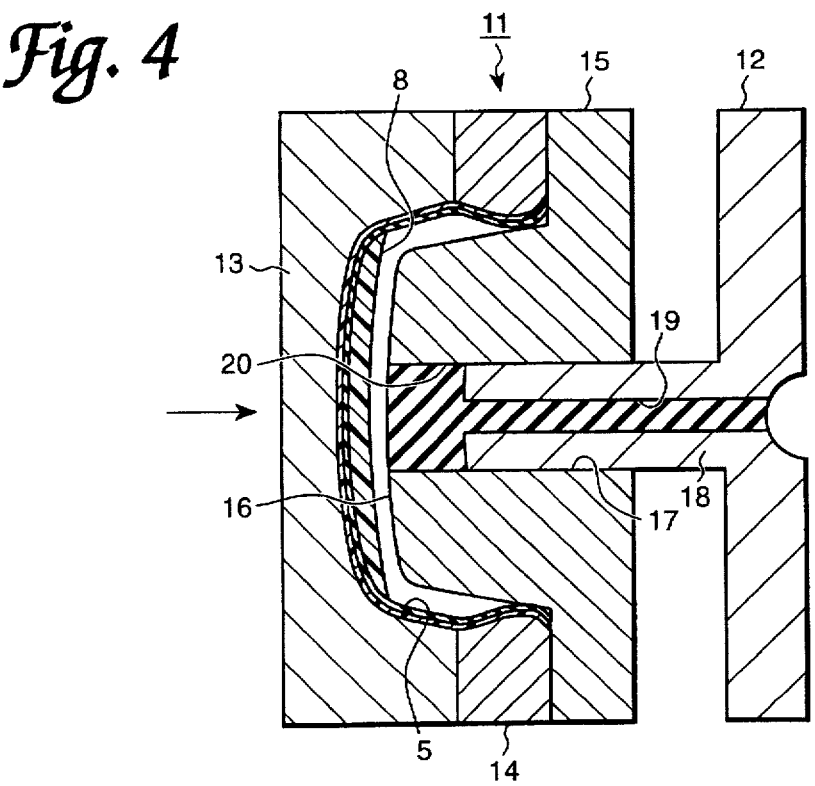

RESIN PRODUCT HAVING A SKIN LAYER AND METHOD FOR MANUFACTURING THE SAME

BACKGROUND OF THE INVENTION

1. Field of the Invention

The present invention relates to resin products having a skin layer, such as a lid for a center console box in an automobile, or for door trim mounted on the interior of automobiles.

2. Description of Related Art

Conventional resin products having skin layers of such type include resin products for automobiles, for example, console lids, door trims and the like. In case of a console lid, it has a box-shaped base and a skin layer which is provided on the base. The base is made of a hard resin material, such as polypropylene, in which fillers are blended (hereinafter referred to as PPF). The skin layer comprises an outer layer of polyvinyl chloride (PVC) and an inner layer of foamed polypropylene bonded to the inner side of that outer layer.

Various ways for producing resin products having a skin layer, such as console lid, have been proposed as, for example, in Japanese Laid-Open Patent Publication Nos. Tokkai-Hei 2-223415 and 4-255312. A manufacturing process can begin with a mold such as at 55 in FIG. 7 with a fixed or stationary mold component 51, a movable mold component 52, a first slide core 53 and a second slide core 54. A skin layer member 56, which is made by preliminarily trimming a sheet, is positioned upon a molding area of the movable mold component 52. Then, plasticized PPF is injected through a gate 58 into a pot 57, which is defined by the fixed mold component 51 and the second slide core 54. Then, the movable mold component 52, the first and second slide cores 53 and 54, respectively, are moved in a direction as indicated by an arrow in FIG. 8. The injected PPF, which was reserved in the pot 57, is then charged into a cavity 59 of the mold 55 so that the PPF is bonded to the skin layer member 56 due to thermal fusion. Thereafter, the PPF is cooled so it solidifies thus forming a base 60. A completed molded console lid 70, as indicated in FIG. 8, is obtained by removing it from the mold 55. The console lid 70 consists of the base 60 with the integral skin layer member 56 bonded thereto.

The molded console lid 70 has its rigidity increased by the base 60, a good appearance is provided by the outer layer of the skin layer 56, and cushioning characteristics are provided by the inner layer, so that an improvement in a resilient feel is achieved.

A downward force may be applied upon the console lid 70, for example when a passenger rests his or her elbow upon the console lid 70. In the conventional console lid 70, the skin layer member 56 is made in the form of a sheet, and the outer and inner layers have a predetermined thickness. The thickness is substantially constant in any position. In order to provide a sufficient softness and excellent cushioning when an elbow is rested thereon, the inner layer of the skin layer 56 should have a relatively large thickness as a whole. If the inner layer has such a large thickness, it becomes very hard to treat the edge of the skin layer 56.

In other words, both edge portions which extend downward beyond the base 60 are generally bent in an inner direction and are engaged with a rib (not shown) which is integrally formed on the inside of the base 60 for reinforcing purposes. The edge portions of the skin layer 56 are secured by subsequently fitting a member (also referred to as "inner base" (not shown)) into the base 60. If the whole skin layer 56 is thick, as mentioned above, a problem may occur in bending and/or engaging the skin layer 56, and it would become very hard to fix and/or treat the edge portions of the skin layer 56. Therefore, enlargement of the thickness of the inner layer is not a preferable countermeasure.

SUMMARY OF THE INVENTION

The present invention overcomes the above-mentioned problems.

An object of the present invention is to provide a resin product having a skin layer member, which provides a soft feel as well as excellent cushioning characteristics at desired positions without hindering the treatment of the edge portion of the skin layer member. Also included is a process for manufacturing the same.

In a first aspect of the present invention, there is provided a process for manufacturing a resin product having a skin layer member thereon, comprising the steps of: positioning the skin layer member, which has been trimmed, on a part of the molding area of a mold; positioning a cushioning layer made of a soft material in a desired position in the mold so that it is contact with at least the skin layer member; molding a base by charging and solidifying a hard resin plasticized material into a cavity defined by molding areas of the mold; and finally removing from the mold a molded product comprising the skin layer member, a cushioning layer and the base which are, following molding, all integrally connected together.

Preferably, the step for molding the base includes charging a hard resin material which is plasticized from a position corresponding to the location of the cushioning layer.

In a second aspect of the present invention, there is provided a resin product, comprising: a base made of a hard resin material formed into a predetermined shape; a skin layer or a skin layer member integrally attached to the base by positioning it on a part of a molding area of a mold after it has been trimmed on the molding area of the base; and a cushioning layer made of a soft material which is provided between the base and the skin layer member by positioning the cushioning layer in a desired position, so that the cushioning layer is in contact with at least the skin layer member on the molding of the base.

Preferably, the base is bonded directly to the skin layer member in those areas where the cushioning layer is not provided therebetween.

In accordance with the present invention, the cushioning layer made of a soft material provides remarkably soft touch at desired positions. Because cushioning material is not provided at the end edges of the skin layer member, problems of treating such end edges are avoided. As a result, the end edges of the skin layer member are positively treated and a molded product providing a desired touch and feel in desired positions is obtained.

The hard resin material which is plasticized is charged from a position corresponding to the cushioning layer. Accordingly, direct application of resin pressure from the gate upon the skin layer member is prevented, and formation of tracing of the gate on the skin layer member of the resultant layer can be prevented.

Since the base is directly bonded to the skin layer member in positions where no cushioning layer is provided between the base and the skin layer member, dislocation of the cushioning layer is avoided.

BRIEF DESCRIPTION OF THE DRAWINGS

FIG. 3 is a cross-sectional view of a mold for illustrating a process for manufacturing a console lid;

FIG. 4 is a cross-sectional view of a mold for illustrating a process for manufacturing a console lid;

DESCRIPTION OF THE PREFERRED EXEMPLARY EMBODIMENT

A preferred embodiment of a lid for a center console structure, according to the present invention, which is a resin product, will be described with reference to FIGS. 1 through 6.

Figure 1:
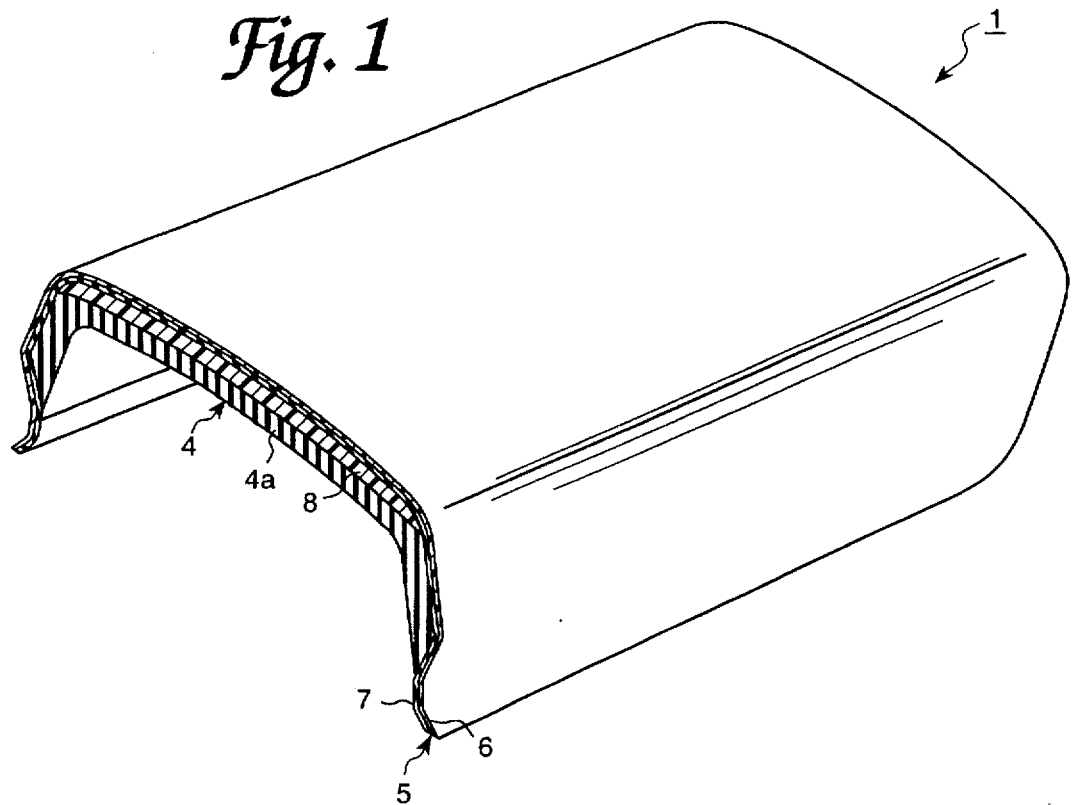
FIG. 1 is a partially cutaway perspective view showing an embodiment of a console lid of the present invention.
Figure 2:
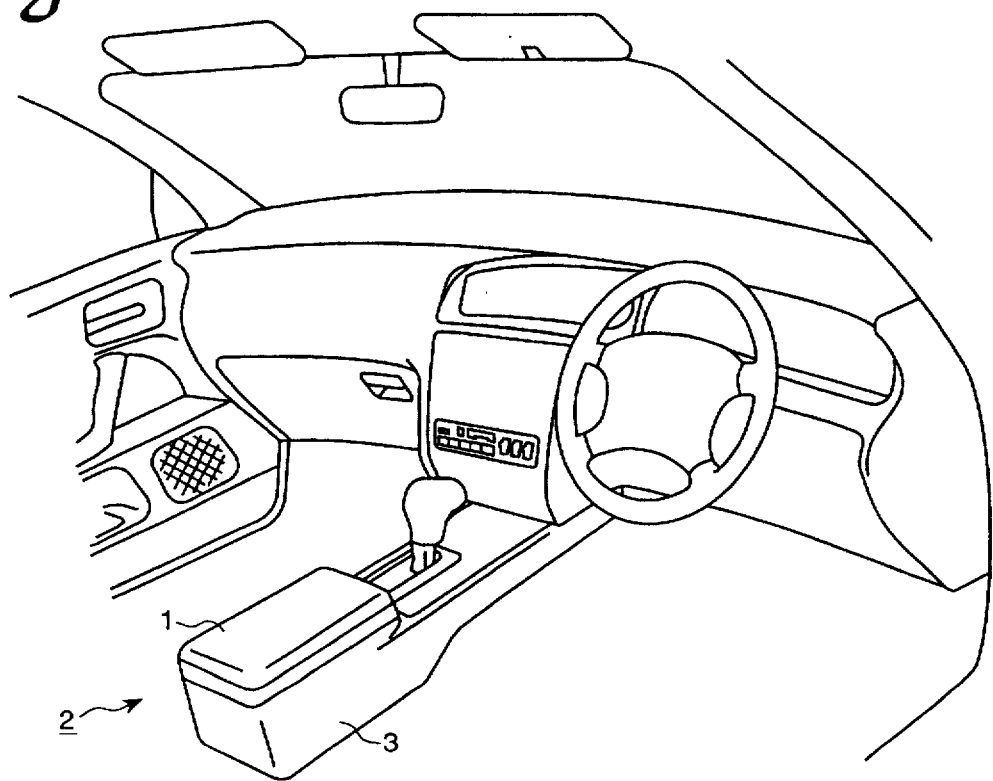
FIG. 2 is a perspective view showing the arrangement of an embodiment of a console box.

FIG. 1 is a partially cutaway perspective view showing the main part of a console lid 1, while FIG. 2 is a perspective view showing an arrangement of a console box 2 including the console lid 1 of the present embodiment. As shown in these drawings, the console box 2 is disposed between the driver and passenger seats in a vehicle. The console box 2 comprises a box-shaped main body 3 with the console lid 1 itself being hinged to the top of the main body 3 so that the main body 3 can be opened or closed by movement of the lid 1.

As shown in FIG. 1, the console lid 1 comprises a box-shaped base 4 and a skin layer member 5 which covers base 4. The base 4 is made of polypropylene with blended fillers including (PPF) for providing a given rigidity. The skin layer member 5 is made of a polyvinyl chloride (PVC) and outer layer 6 having its surface subjected to embossing, and an inner layer 7, made of foamed polypropylene, which is adhered to the inner side of the outer layer 6. These outer and inner layers 6, 7 are adhered to each other and together provide a uniform thickness, which is comparatively thin. The foamed polypropylene which forms the inner layer 7 has an excellent thermal adhesion for PPF from which the base 4 will be formed.

Both edge portions of the skin layer member 5 extend downward beyond the edge portions of the base 4 in FIG. 1 and are then bent inwardly in actual use or assembly of the console lid 1. Each edge portion of the skin layer member 4 is brought into engagement with a rib (not shown) which is integrally formed on the inner side of the base 4. Each edge portion of the skin layer member 5 is then secured by fitting an "inner base member" (not shown) into the base 4. As a result of this, appearance and quality is enhanced.

In the present invention, a cushioning layer 8 made of foamed polyurethane is provided between an upper portion 4a of the base 4 and the corresponding skin layer member 5. The cushioning layer 8 is substantially semi-circular in section and has a thickness which decreases as it approaches the ends thereof. The driver may rest his or her elbow on the console lid 1. The cushioning layer 8 has the greatest thickness where the elbow and the forearm, for example, would most frequently be placed.

A mold 11 which is used for manufacturing the thus formed console lid 1 has the following construction.

As shown in FIG. 3, the mold component, generally shown at 11, comprises a fixed or stationary mold component 12, movable mold component 13, and first and second slide cores 14 and 15, respectively. The movable mold component 13, and the first and second slide cores 14, 15 are movable in right and left directions, as viewed in the drawing, respectively, by conventional hydraulic actuator units (not shown). In the present embodiment, molding areas 13a and 14a of the movable mold component 13 and the first slide core 14, together form the outer side of the console lid 1. On the interior side of the mold, molding area 15a of the second slide core 15, and the front end side of the projection 18 of the stationary mold component 12 collectively form the inner side of the console lid 1.

In general, molding areas 12a, 13a, 14a and 15a define a cavity 16, shown in FIG. 4. The second slide core 15 is formed with a through-hole 17 at the center thereof. The stationary mold component 12 is integrally formed with a projection 18 which is slidably disposed within the through-hole 17. The stationary mold component 12, specifically the projection 18, is provided with a through bore or gate 19 which opens into the cavity 16.

The process for manufacturing the above-mentioned console lid 1 can be described as follows.

A sheet of the skin layer member 5 comprising the outer and inner layers 6 and 7, which are integral with each other, is trimmed to a desired size and shape. The sheet of the skin layer member 5 having a predetermined, trimmed shape, is then placed in the mold 11 so that it is disposed on the molding area 13a, 14a of the movable mold component 13 and the first slide core 14 of the mold 11. The skin layer member 5 can be positively positioned with ease and without using any adhesive since the molding area 14a of the first slide core 14 has a slightly under cut shape.

Subsequently, the cushioning layer 8 is placed in the mold 11 so that it is brought into contact with the skin layer member 5 as shown in FIG. 4. If the mold 11 is in such a configuration, for example, with an undercut shape it suffices to arrange and engage the cushioning layer 8 with the skin layer member 5. Otherwise the cushioning layer 8 may be held to the inner layer 6 of the skin layer member 5 with double side adhesive tape or with a bonding agent in order to correctly position the cushioning layer 8 relative to skin layer member 5.

Then, the movable mold component 13 and the first slide core 14 are brought into contact with the second slide core 15 while leaving a space between the stationary mold component 12 and the second slide core 15 as shown in FIG. 4. Thus, the resulting cavity 16 then defines the shape of the base 4. A predetermined amount of plasticized PPF is then charged via the gate 19 for forming the base 4. At this same time, a pot 20 having a given volume is formed by the through-hole 17 of the second slide core 15 and the projection 18 of the stationary mold component 13 due to the fact that a given space remains defined between the stationary mold component 12 and the second slide core 15. Accordingly, the charged PPF is reserved in the pot 20.

Figure 5:
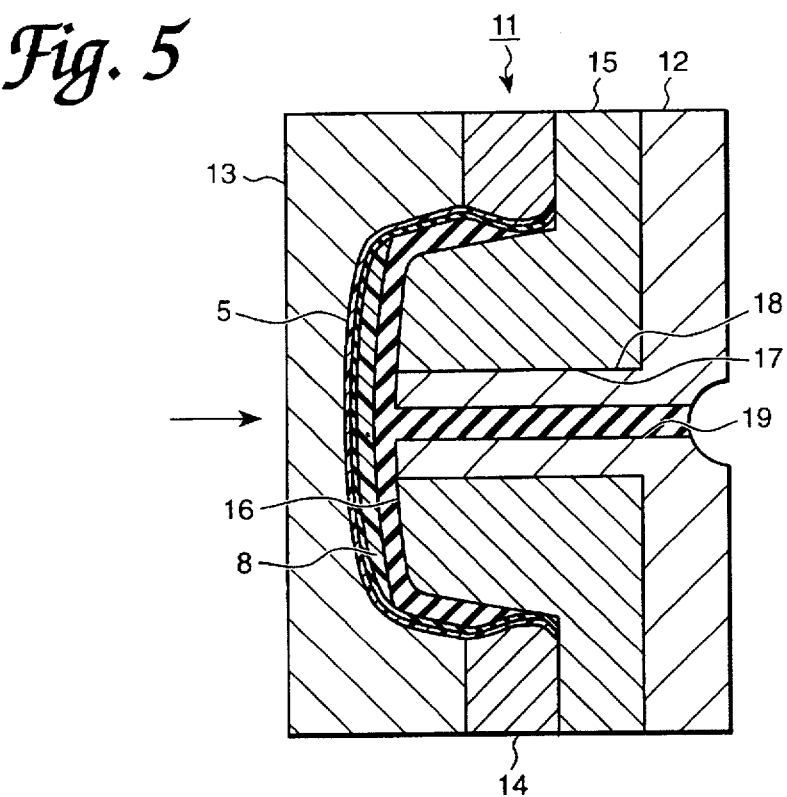
FIG. 5 is a cross-sectional view of a mold for illustrating a process for manufacturing a console lid.

Then, as shown in FIG. 5, the movable mold component 13, the first slide core 14 and the second slide core 15 are collectively moved to the right, as viewed in the drawing, that is, toward the stationary mold component 12. Then the pot 20 is decreased in size and PPF, which had been in the pot 20, is extruded into the cavity 16 flowing toward the periphery of the cavity 16 until finally the cavity 16 is completely filled with the PPF. At this time, the PPF is firmly heat-fused to the foamed polypropylene which forms the inner layer 7 of the skin layer member 5 by the heat conducted from the PPF on the opposite edge sides of the skin layer member 5 where there is no cushioning layer 8. Accordingly, the cushioning layer 8 is suppressed from being dislocated since the periphery of the cushioning layer 8 is secured. Since the cushioning layer 8 is made of foamed polyurethane having a relatively high melting point, it will not be fused with heat from the PPF. Accordingly, the skin layer member 5 can be positively prevented from being thermally damaged relative to the cushioning layer 8.

Figure 6:
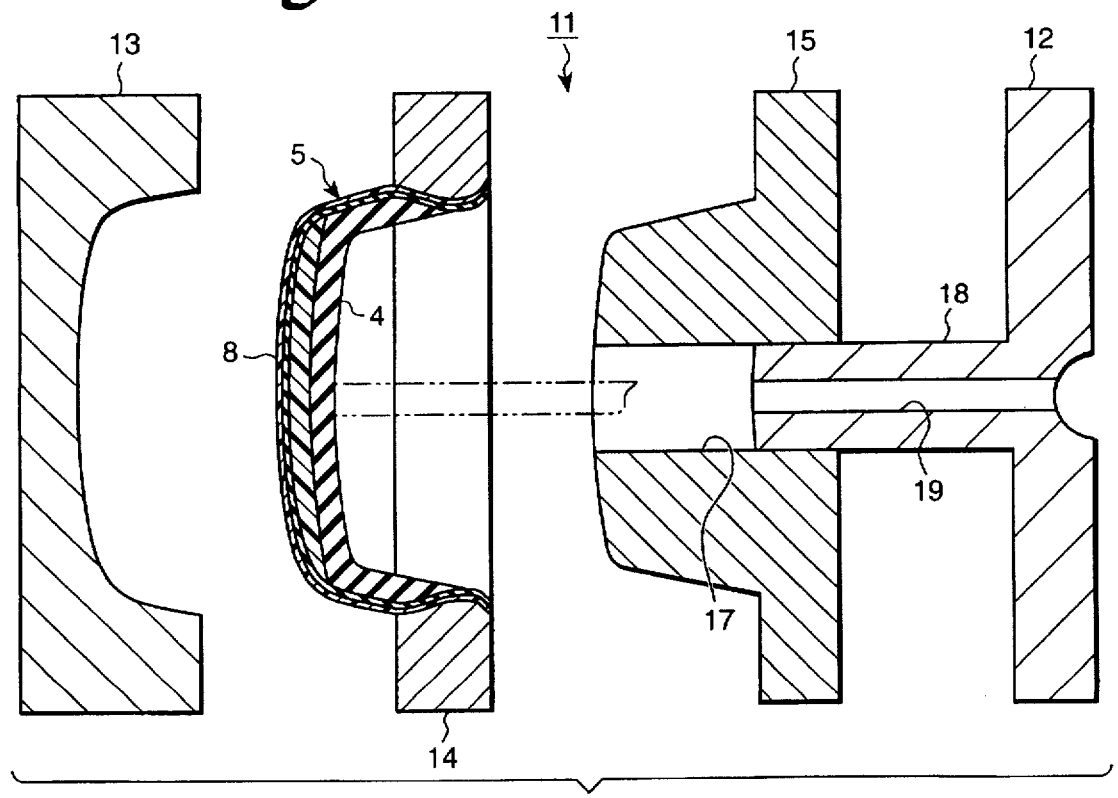
FIG. 6 is a cross-sectional view of a mold for illustrating a process for manufacturing a console lid.
Figure 7:
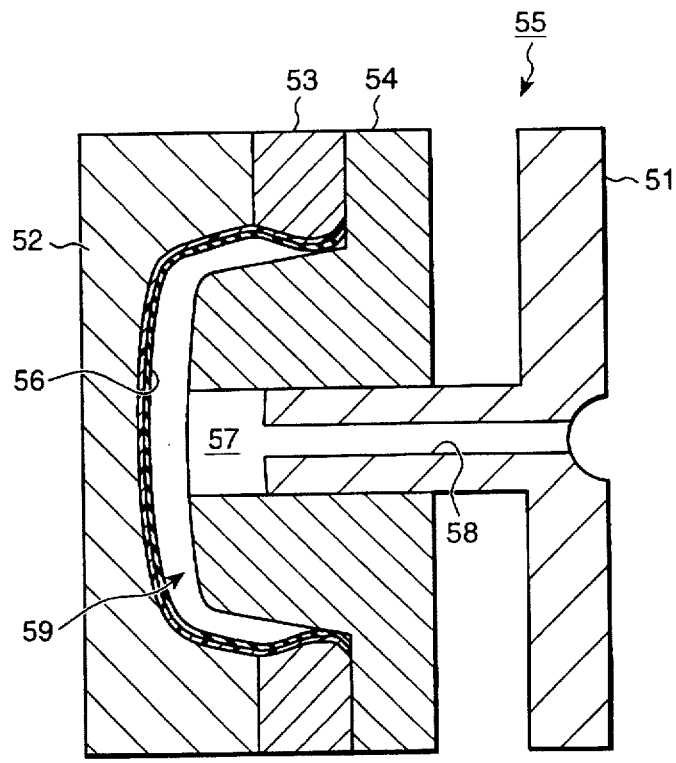
FIG. 7 is a cross-sectional view of a mold illustrating a prior art process for manufacturing a console lid.
Figure 8:
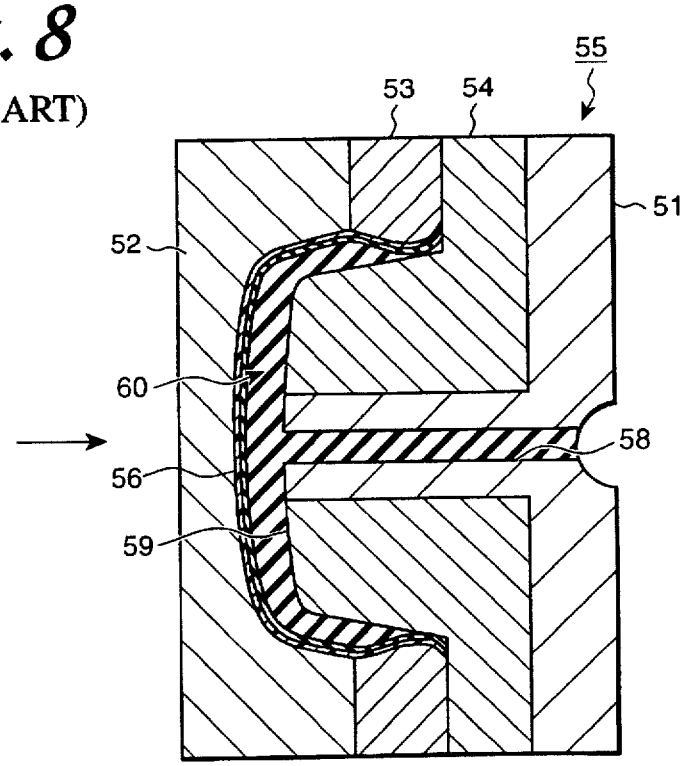
FIG. 8 is a cross-sectional view of a mold illustrating a prior art process for manufacturing a console lid.

Thereafter, the PPF is cooled so it solidifies and forms the base 4. Then, as shown in FIG. 6, a molded product, where the skin layer member 5, the cushioning layer 8 and the base 4 have been integrally connected is removed from the mold 11 by opening that mold. A console lid 1 is thus obtained. On removal of the molded article, the cushioning layer 8, which has been slightly compressed by the charging pressure of the PPF, recovers to an original uncompressed condition. In the console lid 1, both end edge portions of the skin layer member 5 are bent inwardly to engage with the base 4 so that the console lid 1 will be used in that form.

As mentioned above in the present embodiment, a cushioning layer 8 made of a soft material is provided in a position where soft touch is most required. Accordingly, when the driver rests his or her elbow on the console lid 1, he or she feels remarkably comfortable. The position of arrangement of the cushioning layer 8 is appropriately selected.

Since there is no cushioning layer 8 at the opposite end edge portions of the skin layer member 5 in the present embodiment, treatment at the end edge portions will not be hindered. Accordingly, the end edge portions of the skin layer member 5 can be positively bent and secured. As a result of this, an excellent soft touch is obtained and the appearance and quality is prevented from deteriorating.

Furthermore, the cushioning layer 8 is provided in a position corresponding to the upper portion 4a of base 4 and the thickness of the central portion is increased. The gate 19 is provided at a position corresponding to the thickest portion of the molded product. Accordingly, that thickness resists the pressures involved so that it is difficult for pressure of the resin from the gate 19 to move toward the skin layer member 5 so that traces related to gate 19, due to heat or pressure, is prevented from effecting or being seen on the skin layer member 5. As a result, appearance and quality are enhanced.

Various soft touch results can be obtained depending upon the material of the skin layer member 5 by changing the shape, size, thickness and material of the cushioning layer 8 in the present invention. The console lid 1 which provides the desired soft touch can be obtained without changing the mold 11.

It is to be understood that the present invention is not limited to the aforementioned embodiment, but modifications may be made without departing from the spirit and scope of the present invention as follows:

(1) Although the base 4 is molded by a molding process similar to a stamping process in the preferred embodiment, it may be molded by an extrusion process;

(2) Although the cushioning layer 8 is made of foamed polyurethane in the preferred embodiment, it may be made of other soft materials, such as foamed rubber; and (3) Although a resin product in which the present invention is embodied comprises a console lid 1, the present invention may be used in the formation of other resin products such as door trims, arm rests and glove boxes so far as such items have a skin layer member.

Although the skin layer member 5 can include an inner layer 7 and outer layer 6, as in FIG. 1, the inner layer 7 may be omitted in some cases where the cushioning layer 8 is provided. In this case, remarkable reduction in costs can be achieved.

What is claimed is:

1. A process for manufacturing a molded resin product having a skin layer thereon, comprising the steps of:

forming and trimming a skin layer, positioning the trimmed skin layer in a molding area of a mold assembly;

positioning a cushioning layer, made of a soft resilient foamed material, in the mold assembly so that it contacts at least a portion of said skin layer;

molding a base over said cushioning layer by charging and solidifying a thermoplastic resin into a cavity defined within the mold assembly and into contact with at least portions of said skin layer adjacent said cushioning layer, the thermoplastic resin having a melting point below that of the foamed cushioning material; and removing from said mold assembly an integrally molded product comprising the skin layer, cushioning layer and the base.

2. A process for manufacturing a molded resin product having a skin layer as in claim 1 wherein the step of molding the base includes charging a thermoplastic resin which is plasticized from a position corresponding to the thickest portion of the cushioning layer.

3. A process for manufacturing a molded resin product having a skin layer as in claim 1 wherein the thermoplastic resin is charged from a position opposite where the base is to be formed.

4. A molded resin product, comprising:

an interior base, an outer skin layer and an intermediate cushioning layer, said base comprising a thermoplastic resin formed into a predetermined shape and having a melting point lower than said cushioning layer;

said skin layer being integrally attached to said base by having at least a portion directly molded thereto; and a soft cushioning layer formed from a foamed plastic material and positioned between said base and said skin layer, said cushioning layer being placed in direct contact with at least a portion of said skin layer.

5. A molded resin product as defined in claim 4 wherein said base is bonded to said skin layer at locations where said cushioning layer is not provided therebetween.

6. A molded resin product as in claim 4 wherein said base comprises a hard resin.

7. The process as in claim 1 wherein the soft resilient foam material comprises a polyurethane.

8. A molded resin product as in claim 4 wherein the foamed plastic material comprises polyurethane.

* * * * *